United States Patent [19]

Novorsky

[11] 4,401,485
[45] Aug. 30, 1983

[54] METHOD FOR INDUCTIVELY HEATING THIN-WALLED ELONGATED WORKPIECES

[75] Inventor: Donald E. Novorsky, Cleveland, Ohio

[73] Assignee: Park-Ohio Industries, Inc., Cleveland, Ohio

[21] Appl. No.: 285,788

[22] Filed: Jul. 22, 1981

[51] Int. Cl.³ .................. C21D 1/10; C21D 1/18; C21D 1/42

[52] U.S. Cl. .................... 148/150; 148/146; 266/123; 266/127

[58] Field of Search ............... 148/144, 146, 150, 152, 148/153, 145, 148; 266/123, 125, 127, 129

[56] References Cited

U.S. PATENT DOCUMENTS

| | | | |
|---|---|---|---|
| 2,076,515 | 4/1937 | Kinzel | 148/151 |
| 2,541,116 | 2/1951 | Somes | 148/146 X |
| 3,278,349 | 10/1966 | Huseby et al. | 148/144 X |
| 3,915,763 | 10/1975 | Jennings et al. | 148/144 X |

FOREIGN PATENT DOCUMENTS

| | | | |
|---|---|---|---|
| 119310 | 9/1979 | Japan | 148/144 |
| 620386 | 3/1949 | United Kingdom | |

OTHER PUBLICATIONS

Somes, H. E., "The Development of High Speed Induction Heating for the Hardening of Internal Diameters", in *Transactions of the Electrochemical Society*, vol. 79, 1941.

*Primary Examiner*—M. J. Andrews
*Assistant Examiner*—Alan E. Schiavelli
*Attorney, Agent, or Firm*—Body, Vickers & Daniels

[57] ABSTRACT

A method and apparatus of quench hardening to a desired depth the inner surface of an axially extending bore in an elongated, thin-walled workpiece having an outer, axially extending surface wherein the bore has a selected, uniform cross-sectional shape, which method and apparatus involves providing an inductor with an outer shape generally matching, but smaller than, the cross-sectional shape of the bore, supporting the workpiece with the axis extending vertically, energizing the inductor with a known frequency and at a selected power level, moving the energized inductor downwardly through the bore to inductively heat the inner surface progressively while applying no fluid quench to the inner surface, letting the workpiece cool and then moving the inductor upwardly through the bore to progressively heat the inner surface while progressively liquid quenching the inner surface immediately below and after the progressive heating operation.

7 Claims, 9 Drawing Figures

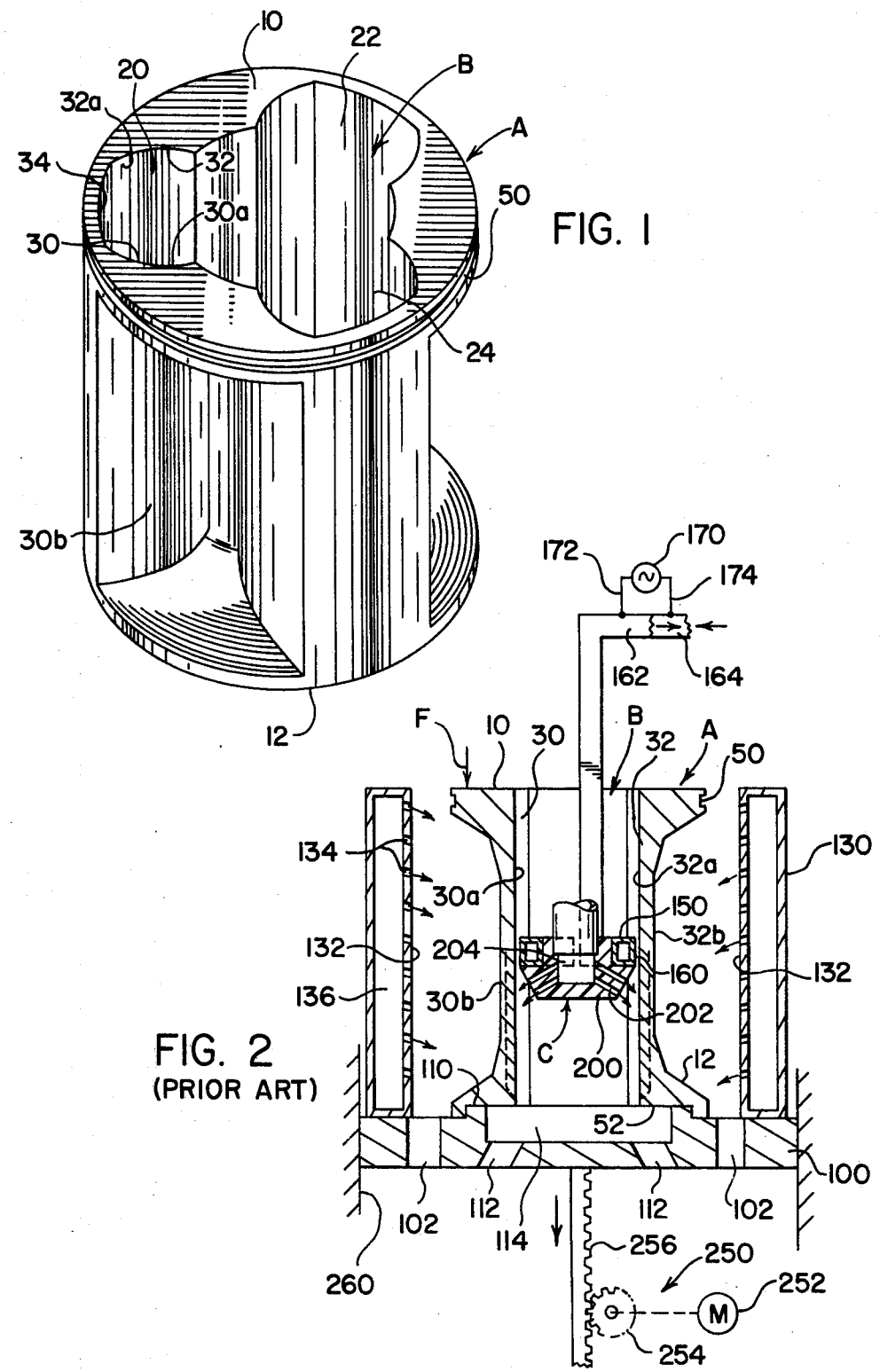

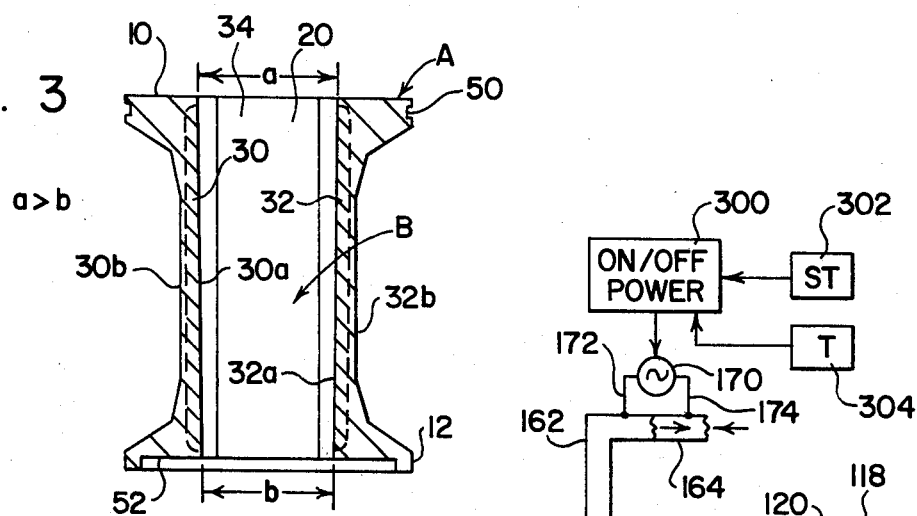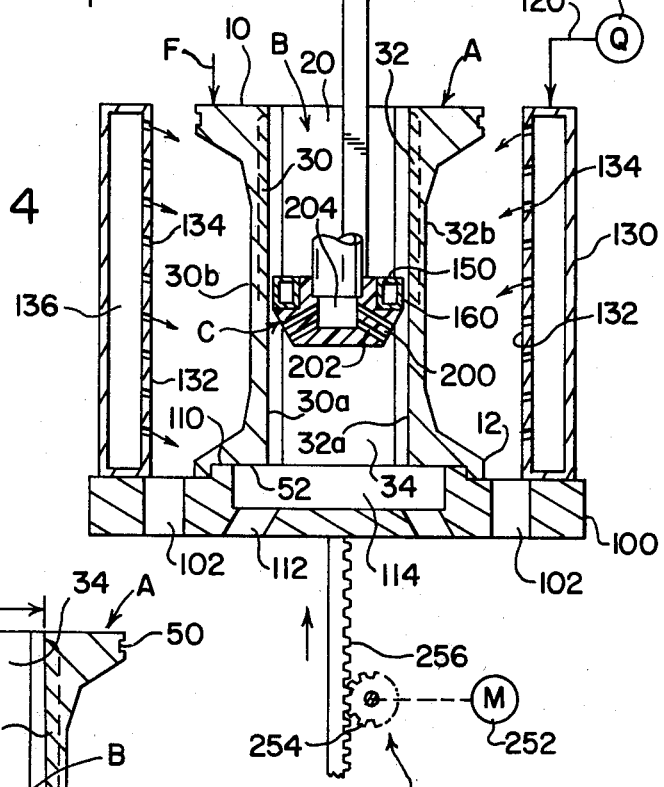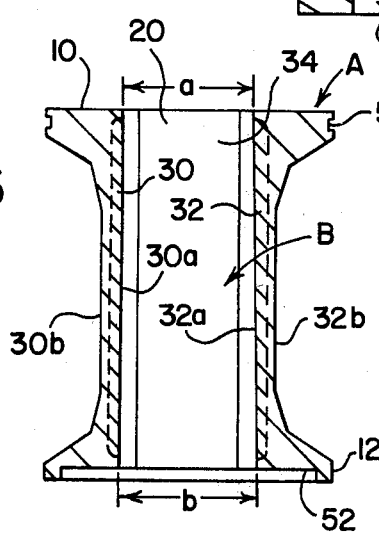

METHOD FOR INDUCTIVELY HEATING THIN-WALLED ELONGATED WORKPIECES

The present invention relates to the art of induction heating and more particularly to a method and apparatus for using induction heating to harden the inner surface of a bore extending through a thin-walled, elongated workpiece.

BACKGROUND OF THE INVENTION

The present invention is particularly applicable for inductively heating the three-lobed internal bore or passage in a thin-walled steel workpiece used in the drive assembly of a front wheel driven vehicle and it will be described with particular reference thereto; however, the invention has broader applications and may be used for surface hardening the bore extending through thin-walled workpieces, irrespective of the profile or shape of the bore defining the inner surface. Although the method hardens only selected axially extending areas of the bore, it could be used to harden the total inner surface of the bore.

It is somewhat common practice to harden the inner cylindrical surface of various bores, such as the hub on a wheel, by providing a circular inductor matching the cylindrical inner surface and generally smaller in diameter so that a coupling gap is established between the inductor and the inner surface. This inductor is energized and moved along the cylindrical surface to heat progressively and by induction the cylindrical surface. The surface is hardened by providing a quench body below the inductor which directs a quenching liquid outwardly to quench harden the previously heated portion of the cylindrical surface. This is standard practice and has been used for many years. To provide uniform, progressive heating and quench hardening, it is also known to rotate the workpiece about the central axis of the cylindrical bore so that the progressing inductor and its quench body act upon a rotating cylindrical surface. When this procedure is employed for workpieces having a substantial amount of metal mass around the cylindrical surface, the cylindrical surface is not substantially distorted by the progressive heating and quench hardening. As the mass surrounding the cylindrical surface is decreased to a thin-walled structure, such as where the depth of hardening is about 50% of the total wall thickness, axial distortion often occurs during the progressive hardening procedure. Thus, the cylindrical surface must be ground after hardening if precise dimensions are to be retained. In some instances, even with heavier wall thicknesses, grinding is necessary to obtain a straight cylindrical bore after hardening of the inner surface.

The combined progressive heating and quench hardening together with a subsequent grinding operation has been successful when the thin-walled workpiece has a bore with a cylindrical surface. Extreme difficulties have been experienced when the bore extending through the thin-walled workpiece is not cylindrical. The inner surface of a non-cylindrical bore extending through a thin-walled workpiece cannot be economically ground to correct any distortions in an axial direction. This inability to correct distortion created by progressive hardening of a non-cylindrical bore in a thin-walled workpiece is even more pronounced as the axial length of a bore increases. For these reasons, progressive heating and subsequent quench hardening of an axially extending bore through a thin-walled workpiece, when the bore is non-cylindrical, has not been able to be used when tolerances such as 0.001 to 0.003 inches are to be maintained over a length of four to six inches. Consequently, substantial difficulty has been experienced in surface hardening the internal, three-lobed bore for the outer housing of a front wheel drive mechanism in a motor vehicle. This elongated housing, known generally as a "tripot housing" requires a close tolerance in an axial direction after hardening. Internal machining is not practical.

THE INVENTION

The present invention relates to a method and apparatus which is adapted for surface hardening the internal surface or bore of a tripot housing to produce a non-tapered inner surface, even though the wall thickness around the bore is only approximately twice the desired depth of the hardness pattern necessary to develop the needed wear characteristics. The invention will be described with particular reference to this workpiece; however, the invention can be used for surface hardening areas of various elongated bores extending in and through thin-walled workpieces, whether or not the surface is cylindrical or non-cylindrical.

In accordance with the present invention, there is provided a method of preparing an elongated, thin-walled workpiece with an outer axially extending surface and an inner axially extending surface, which inner surface is defined by an axially extending bore having a selected, uniform cross-sectional shape in a direction transverse to the elongated axis of the workpiece. This method includes providing an inductor with an outer shape generally matching, but smaller than, the cross-sectional shape of the bore, at least in the areas to be hardened, energizing the inductor with a known frequency and at a selected power level and moving the energized inductor axially through the bore to inductively heat the inner surface areas while liquid quenching only the outer surface. The workpiece is pretapered and can then be progressively heated by scanning the inductor in the appropriate direction.

In accordance with another aspect of the present invention, there is provided an apparatus for quench hardening to a selected depth the inner surface of an axially extending bore in an elongated, thin-walled workpiece having an outer, axially extending surface, which bore has a selected cross-sectional shape in a direction transverse to the elongated axis of the workpiece and bore. This apparatus includes an inductor with an outer shape generally matching, but smaller than, the cross-sectional shape of the bore; means for supporting the workpiece with the axis extending vertically; means for energizing the inductor with a known frequency and a selected power level; means for moving the energized conductor downwardly through the bore to inductively heat at least a portion of the inner surface progressively while applying no fluid quench to the inner surface; means for moving the inductor upwardly through the bore to progressively heat the inner surface thereof; and, means for progressively liquid quenching the inner surface immediately below and after the progressive heating of the inner surface upwardly.

In accordance with another aspect of this invention, means for selectively quenching the outer surface continuously during both the upward and downward scanning of the inductor with respect to the inner bore. In accordance with the invention, the scanning of the inductor in the bore can be accomplished by moving the workpiece axially along the axis of the bore or by moving the inductor axially along this axis. In each instance, the inductor is moved through the bore in a first direction for heating the inner surface and in the opposite direction for heating and quenching the inner surface. By utilizing this apparatus and the method performed by the apparatus, the inner bore remains straight within acceptable tolerances of less than 0.003 inch taper in approximately 80 millimeters of length. In accordance with another aspect of the invention, the heating scan in one direction through the bore and the heating and quenching scan in the other direction may be spaced from the ends of the bore so that the hardness pattern is spaced from the ends of the bore.

The primary object of the present invention is the provision of a method and apparatus for hardening the inner surface of an elongated bore extending through a thin-walled elongated workpiece, which method and apparatus does not produce appreciable taper in the workpiece.

Still a further object of the invention is the provision of a method and apparatus, as defined above, which method and apparatus utilizes a first scanning operation for heating the inner surface of the bore and then a second scanning operation in the opposite direction with both progressive heating and quench hardening.

Still a further object of the present invention is the provision of a method and apparatus, as defined above, which method and apparatus also employs a continuous liquid quenching of the outer surface of the workpiece during the dual scan so that the workpiece will be cooled after the first scan and before the second scan.

Still another object of the present invention is the provision of a method and apparatus, as defined above, which method and apparatus results in a relatively straight, hardened surface for the bore with an acceptable hardness pattern.

Yet a further object of the present invention is the provision of a method and apparatus, which method and apparatus can be used when the cross-sectional profile of the axially extending bore is not circular.

Still another object of the present invention is the provision of a method and apparatus, which method and apparatus can be performed with a single inductor without changing the orientation or axial position of the workpiece. Such positional changes could result in less uniformity of the end result.

These and other objects and advantages will become apparent from the following description taken together with the accompanying drawings.

BRIEF DESCRIPTION OF THE DRAWINGS

In the present specification, the following drawings are incorporated:

FIG. 1 is a pictorial view of the tripot used in the front drive assembly of an automobile having a front wheel drive mechanism;

FIG. 2 is a cross-sectional view showing, schematically, an approach for inductively heating and quench hardening the center bore of the workpiece shown in FIG. 1;

FIG. 3 is a cross-sectional view of the workpiece shown in FIG. 1 after it has been processed in accordance with the procedure set forth in FIG. 2;

FIG. 4 is a view similar to FIG. 2 showing the first scanning operation used in the method and apparatus of the present invention;

FIG. 5 is a cross-sectional view of the workpiece shown in FIG. 1 after the step illustrated in FIG. 4 has been performed.

PREFERRED EMBODIMENT

Figure 6:
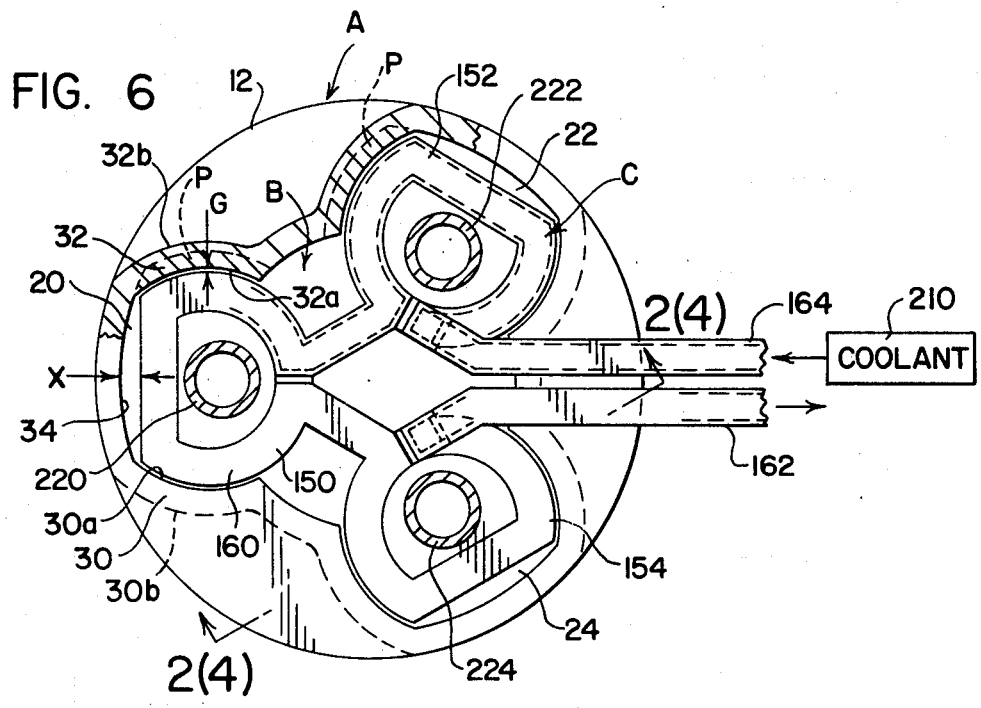
FIG. 6 is a top view showing the inductor employed in the preferred embodiment of the present invention, and having a cross-section line 2—2 generally corresponding to the area of cross-sectioning shown in FIGS. 2 and 4.
Figure 7:
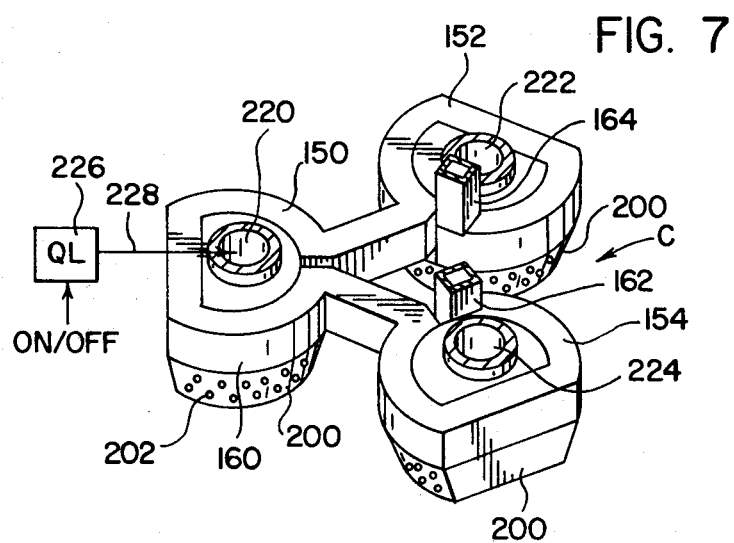
FIG. 7 illustrates the preferred embodiment of an inductor and quench body employed in practicing the invention; and, FIG. 8 and FIG. 9 are graphs showing the hardness at increased depths of the surface processed by the present invention.

Referring now to the drawings, wherein the showings are for the purpose of illustrating the preferred embodiment of the invention only and not for the purpose of limiting same, FIG. 1 shows an elongated, thin-walled workpiece A having a generally circular upper end 10, a generally circular lower end 12 and an elongated bore B having a uniform cross-section in a transverse direction between ends 10, 12. In the workpiece A for which the invention is to be used, the elongated bore B has a uniform cross-section in a transverse direction, which cross-section includes three equally spaced lobe areas 20, 22 and 24, best shown in FIG. 6. These lobes make the bore B non-circular; however, the present invention is also applicable to a circular cross-sectioned bore having a cylindrical inner surface. Since lobe areas or sections 20, 22 and 24 are essentially identical, only section 20 will be described in detail and this description will apply equally to the other sections. Lobe 20 has opposed walls 30, 32 and an end wall 34, all of which have essentially the same thickness. Walls 30, 32 are spaced from each other and include inner facing surfaces 30a, 32a respectively. These surfaces are somewhat concave and are to be provided with a hardness pattern P extending along the arcuate surfaces 30, 32 and generally between ends 10, 12. Walls 30, 32 also include outer surfaces 30b, 32b which are generally parallel to inner surfaces 30a, 32a and are spaced from each other a distance approximately twice the thickness of the hardness pattern P. In practice, the height of the workpiece is approximately 80.0 millimeters and the hardness pattern is approximately 9.80 millimeters from the top of the workpiece and 9.20 millimeters from the bottom of the workpiece. The thickness of walls 30, 32 and 34 is approximately 4.5 millimeters, the hardness pattern P is to have a depth of approximately 2.3 millimeters. An upper groove 50 has an axial height of approximately 3.0 millimeters and the edge of end 10 is approximately 7.0 millimeters. The inner diameter of the bore, not including the lobes, is approximately 51.0 millimeters. The radial length of the heating pattern P along surfaces 30, 32 is approximately 16.0 millimeters which covers these surfaces. Pattern P extends in a strip axially through the workpiece and along walls 30, 32. A lower recess 52 is approximately 4.0 millimeters in depth and has a diameter of approximately 86.5 millimeters. The diameter of the workpiece is approximately 92.5 millimeters. Material of the workpiece is SAE 1050 M steel. This information regarding the workpiece can be determined by inspection of the workpiece and is submitted herein to explain in detail the particular workpiece to which the present invention is directed. The depth of the pattern P in a thin-walled workpiece is at least about 30% of the total thickness of the wall on which the pattern is created and generally about 50% of the thickness. In this manner, quenching from the outside walls 30a, 30b can be used to cool the workpiece after it has been progressively heated. The cooling occurs from the outside surface toward the inner surface. This feature will be explained later.

The present invention relates to a method and apparatus for creating the hardness pattern P in the spaced surfaces 30, 32 of the various lobe sections or areas 20, 22 and 24 of workpiece A, without more than about 0.003 inch runout or taper between ends 10, 12. In practicing the present invention, there is provided an inductor C including lower inductor loops 150, 152 and 154 generally matching and spaced inwardly from the various surfaces in lobe areas 20, 22 and 24, respectively. Only loop portion 150 will be described in detail and this description will apply equally to the other loop portions 150, 152 and 154 of conductor C. Loop 150 includes an inductor 160, best shown in FIG. 6, and is energized by high frequency power source through leads 162, 164 which connects conductors 160 of all loops 150, 152 and 154 in electrical series. In practice, a motor generator set 170 has fishtails or leads 172, 174 adapted to be connected across leads 162, 164 for creating an alternating current flow through loops 150, 152 and 154. This current inductively heats the various surfaces 30a, 32a. The outer contour of conductor 160 is spaced from surfaces 30a, 32a a distance G, which distance is generally in the range of 0.030 to 0.040 inches or any other spacing to produce the desired flux coupling between conductor 160 and surfaces 30a, 32a as the inductor is moved relative to these surfaces. As can be seen in FIG. 6, conductor 160 is spaced from wall 34 a distance X which distance is substantially greater than the coupling gap G so that conductor 160 does not heat the inner surface of wall 34 to a temperature sufficient for subsequent hardening. To provide progressive quenching, each of the lobes includes downwardly extending quench housing 200 below conductors 160 and including a plurality of orifices 202 connected to an inner cavity 204. Leads 162, 164 and conductors 160 are hollow and interconnected in a series fashion so that fluid supplied from an appropriate supply source 210 can be circulated through the electrical circuit of inductor C for the purpose of preventing undue heating of the inductor. Support means 220, 222 and 224 combine with rigid leads 162, 164 to fix inductor C in a vertical direction. Beams 220, 222, 224 are hollow and each are connected to a common supply of quenching liquid 226 connected by appropriate piping 228 so that selectively, supply 226 can be energized to direct quenching liquid through quench housing 200, which have the openings 202 facing surfaces 30a, 32a. Selective energizing of quench supply 226 to perform the present invention can be by any appropriate control arrangement not forming a part of the present invention, such as a program microprocessor system.

As previously mentioned, inductor C is moved relative to the surfaces 30a, 30b of bore B. This can be done by holding inductor C stationary and moving workpiece A axially with respect thereto. In addition, workpiece B could be moved while conductor C is stationary. The specific structure of the inductor C and the arrangement for causing relative movement between the inductor and workpiece does not form a part of the present invention since a variety of structures could be employed. In practice, workpiece B is secured onto a platform 100 in a fixed relationship. The workpiece is clamped by standard spring clamps which are forced against the upper surface 10 as indicated by arrows F. Thereafter, the inductor C is moved into and out of a workpiece as it is held stationary. In the drawings, the workpiece itself is moved to accomplish this action. Irrespective of the moving concept employed, the present invention relates to an arrangement for causing the relative movement for scanning bore B in two directions by inductor C. The schematically illustrated system can be employed for this purpose. This system includes openings 102 in platform 100 to allow drainage of quenching liquid. A locator rim 110 is adapted to be received in the lower recess 52 of workpiece B for centering and locating the workpiece with respect to the inductor and platform 100 which are aligned in a vertical direction. Openings 112 communicate an inner chamber or clearance portion 114 of platform 100 so that the quench body 200 can move downwardly a sufficient distance to allow conductor 160 to move into the lower portion of workpiece A. Openings 102 and openings 112 provide for passage of quenching liquid used in accordance with the present invention. Quenching liquid can be supplied from an appropriate pressurized source 118 through line 120 to quenching ring 130, having an inner cylindrical surface 132 facing workpiece A and provided with a plurality of somewhat downwardly projecting orifices 134 communicated with the inner cavity 136. In this manner, quenching liquid can be supplied through line 120 to cavity 136. Thereafter, the quenching liquid can be directed to the outer surfaces of walls 30, 32 and 34 for the purpose of maintaining these walls cooled during processing of the elongated workpiece A in accordance with the present invention.

As previously mentioned, inductor C could be moved downwardly and then upwardly in practicing the invention. In the illustrated embodiment, a drive mechanism 250 can be used for providing relative movement of the inductor and workpiece. This mechanism employs a motor 252 driving pinion 254 which is coupled with a rack 256. The rack is coupled to either inductor or the platform 100. In the illustrated embodiment, the rack is coupled to the platform and the platform, with inductor ring 130 and the workpiece, is reciprocated within a guide bore 260. As a direct equivalent, the platform could remain stationary and the inductor could be moved by the rack. For the purposes of simplicity, the inductor is illustrated as being fixed. In accordance with a modification of the preferred embodiment, the same arrangement could be used for moving the inductor by rack 256 or by any other appropriate reversible drive mechanism.

Referring now to FIG. 2, an arrangement for providing hardness patterns P in surfaces 30, 32 of the various lobes is illustrated. In accordance with this process, inductor C is in the lowered position. It is then energized and progressed upwardly in accordance with standard procedure in the induction heating art. Quenching liquid is directed through orifices 202 against the previously heated portion of the surfaces to quench harden surfaces 30a, 32a, which have been previously heated by scanning with conductor 160. In accordance with this concept, quenching liquid is directed through cylindrical quench ring 130 to quench the outside surface of workpiece C as the pregressive heating and liquid quenching continues from lower end 12 to upper end 10. When this procedure is employed, as schematically illustrated in FIG. 2, the upper diameter a is greater than the lower diameter b by a certain amount, which in practice has been as high as about 0.006 to 0.008 inches. Such a taper is unacceptable. The present invention overcomes this disadvantage by performing the method illustrated in FIG. 4 prior to performing the normal scanning operation as shown in FIG. 2. In accordance with this aspect, the inductor C is scanned through bore B from end 10 to end 12. While this is being done, motor generator 170 is energized by activation from an appropriate control, schematically illustrated as control 300 having a start command input 302 and a control timer 304. After a start of cycle command is received, timer 304 controls a cycle in accordance with standard control technology. This does not form a part of the present invention.

Figure 8:
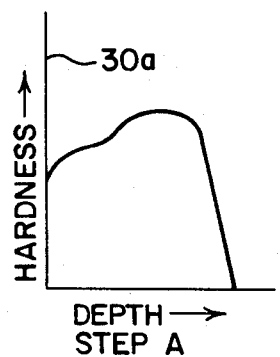
Figure 9:
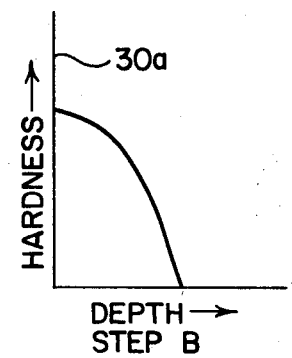

As motor generator 170 is energized by control 300 to produce a desired, selectable power level across leads 162, 164, inductor C is scanned downwardly through workpiece A as the outer surface thereof is quenched by quenching ring 130. The quenching liquid used in quench housing 200 is used during this down scan. The downward scan of inductor C is a heating operation only and quenching occurs from the outside surface by conduction through the walls of the workpiece. Heating is started at a position spaced below the top surface of end 10 and continues from end 10 to end 12. Thereafter, there is time delay before the upward scan shown in FIG. 2 is performed. By using a delay, the previously heated workpiece surfaces are cooled by external liquid quenching. An internal hardness pattern of the workpiece is created. This pattern is shown generally in FIG. 8. The hardness is greater at a position spaced from surface 30a since quenching is by conduction from the ouside surface 30b. The workpiece with a pretapered bore is shown generally in FIG. 5. This creates a situation where the inner bore B is pretapered in the direction opposite to the resulting undesired taper created by performing the hardening operation as shown in FIG. 2. This opposite pretapering is fixed by crystalgraphic memory into the workpiece preparatory to the workpiece being processed by the upward scanning operation shown in FIG. 2. At that time, the workpiece is scanned in an upward direction and immediately thereafter quench hardened by a liquid flow. The pretaper specifically and intentionally created by the first scan is combined with the hardening process of FIG. 2 to produce a relatively straight workpiece. This is not possible by processing with the standard procedure illustrated in FIG. 2. The resulting hardness pattern of the finished workpiece is shown schematically in FIG. 9. A hard outer surface is provided with a gradual decrease in hardness inward of surface 30a.

Parameters of the preferred embodiment of the invention are shown in the following example:

EXAMPLE I

Material —1050 M Steel
Surface Hardness —58-64 RC
Hardness at 0.040 —50 RC
Quench Media —3% VCONA
Quench Temperature —98° F.
Quench Pressure (ID) —3.5 PSI
Quench Pressure (OD) —30 PSI
Scan Down —0.375 in./sec.
Scan Up —0.375 in./sec.
Down Heat —0-8.7 sec.
O.D. Quench —0-21.0 sec.
Up Heat —9.0-17.7 sec.
I.D. Quench —9.0-21.0 sec.
Setting —800 Volts, 219 Amps, 175 KW 175 KVAR 10 KC
Coupling Gap —0.030

A modification of Example I is now used in the preferred embodiment of the invention. The modifications involve using different scanning parameters such as a difference in the scanning speed and a difference in the power level directed from the motor generator set 170 to the inductor. These changes in the parameters are set forth in the following example:

EXAMPLE II

DOWN SCAN
Delay —0.5 inches from top
Speed —0.65 in./sec.
Power —88 KW 10 $KH_2$
DOWN DELAY
Time —2.0 seconds
UP SCAN
Speed —0.55 in./sec.
Power —92 KW 10 $KH_2$

Having thus described the invention, the following is claimed:

1. A method of quench hardening to a selected depth the inner surface of an axially extending bore in an elongated, thin-walled workpiece having an outer, axially extending surface, which bore has a selected, uniform cross-sectional shape in a direction transverse to the elongated axis of said workpiece and bore, said method comprising the steps of:
   (a) providing an inductor with an outer shape generally matching, but smaller than, said cross-sectional shape;
   (b) supporting said workpiece with said axis extending vertically;
   (c) energizing said inductor with a known frequency and a selected power level;
   (d) moving said energized inductor downwardly through said bore to inductively heat said inner surface progressively while applying no fluid quench to said inner surface;
   (e) then immediately moving said inductor upwardly through said bore to progressively heat said inner surface; and,
   (f) progressively liquid quenching said inner surface immediately below and after said progressive heating of said inner surface upwardly.

2. The method as defined in claim 1 including the step of quenching said outer surface with a fluid during said inductive heating downwardly through said bore.

3. The method as defined in claim 2 including the step of quenching said outer surface with a fluid during said inductive heating upwardly through said bore.

4. The method as defined in claim 1 including the step of quenching said outer surface with a fluid during said inductive heating upwardly through said bore.

5. The method as defined in claim 1 including the step of energizing said inductor during said inductive heating upwardly at said known frequency.

6. The method as defined in claim 5 including the step of energizing said inductor during said inductive heating upwardly at said selected power level.

7. The method as defined in claim 1 including the step of energizing said inductor during said inductive heating upwardly at said selected power level.

* * * * *